US010060787B2

(12) United States Patent
Balooch et al.

(10) Patent No.: US 10,060,787 B2
(45) Date of Patent: Aug. 28, 2018

(54) DEVICE AND SYSTEM FOR PERSONAL UV EXPOSURE MEASUREMENTS

(71) Applicant: L'ORÉAL, Paris (FR)

(72) Inventors: Guive Balooch, New York, NY (US); Rafal Pielak, Richmond, CA (US); Yunzhou Shi, San Bruno, CA (US)

(73) Assignee: L'ORÉAL, Paris (FR)

( * ) Notice: Subject to any disclaimer, the term of this patent is extended or adjusted under 35 U.S.C. 154(b) by 0 days.

(21) Appl. No.: 15/398,397

(22) Filed: Jan. 4, 2017

(65) Prior Publication Data
US 2017/0191866 A1 Jul. 6, 2017

Related U.S. Application Data

(60) Provisional application No. 62/274,689, filed on Jan. 4, 2016, provisional application No. 62/402,253, filed on Sep. 30, 2016.

(51) Int. Cl.
G01J 1/50 (2006.01)
G01J 1/02 (2006.01)
(Continued)

(52) U.S. Cl.
CPC ............ G01J 1/0233 (2013.01); G01J 1/029 (2013.01); G01J 1/0219 (2013.01); G01J 1/0238 (2013.01); G01J 1/0271 (2013.01); G01J 1/429 (2013.01); G01J 1/4228 (2013.01); G01J 1/50 (2013.01); G01J 1/0266 (2013.01);
(Continued)

(58) Field of Classification Search
CPC .......... G01J 1/50; G01J 1/0233; G01J 1/0219; G01J 1/429; G01J 1/0271; G01J 1/029
See application file for complete search history.

(56) References Cited

U.S. PATENT DOCUMENTS 5,387,798 A 2/1995 Funakoshi et al.
5,411,835 A 5/1995 Brinser
(Continued)

OTHER PUBLICATIONS

International Search Report and Written Opinion of the International Searching Authority dated Apr. 17, 2017 in PCT/US2017/012108 filed Jan. 4, 2017.
(Continued)

Primary Examiner — David Porta
Assistant Examiner — Faye Boosalis
(74) Attorney, Agent, or Firm — Oblon, McClelland, Maier & Neustadt, L.L.P.

(57) ABSTRACT

A system is provided for determining personal ultra-violet (UV) radiation measurements, comprising: a measurement device configured to measure UV irradiation; and a terminal device configured to receive or capture an output of the measured UV irradiation from the measurement device and to determine a specific user's personal UV exposure risk level based on at least the measured sun irradiation and information of a skin type of the specific user. The measurement device configured to measure UV radiation exposure includes a surface that includes a plurality of different sections that each have a different sensitivity to UV radiation exposure, and each of the plurality of different sections are configured to display a different color in response to the UV radiation exposure.

12 Claims, 17 Drawing Sheets
(15 of 17 Drawing Sheet(s) Filed in Color)

I. Sensing:

- Obtain patch/user ID by scanning NFC with smart phone
- Allow tracking multiple users with the same smart phone
- Obtain images of the patch.

Quality Control:

- analyze for repetitiveness, reject unreliable images, extract 3 images within tolerance and average Image correction:

- Distortion
- Reflection
- Uneven illumination
- White balance
- Printing artifact Image analysis:
- Quality control: Locate the reference colors, analyze for linearity for quality control, correct for nonlinearity
- Locate the target color
- Compare the target color to reference colors
- Obtain UV values using pre-determined UV/color calibration

(51) Int. Cl.
*G01J 1/42* (2006.01)
*G01J 3/46* (2006.01)

(52) U.S. Cl.
CPC ............... *G01J 2001/0257* (2013.01); *G01J 2001/0276* (2013.01); *G01J 2001/428* (2013.01); *G01J 2003/466* (2013.01)

(56) References Cited

U.S. PATENT DOCUMENTS

| | | |
|---|---|---|
| 7,589,331 B2 | 9/2009 | Havens et al. |
| 2006/0289779 A1 | 12/2006 | Marmaropoulos |
| 2006/0289796 A1 | 12/2006 | Havens et al. |
| 2007/0210264 A1 | 9/2007 | Havens et al. |
| 2007/0269496 A1 | 11/2007 | Gamble |
| 2009/0090865 A1* | 4/2009 | Lub ............... G01J 1/429 250/331 |
| 2014/0195198 A1* | 7/2014 | Reshef ............ G06F 17/00 702/188 |
| 2015/0238774 A1* | 8/2015 | Anderson ........ A61F 13/00063 604/20 |

OTHER PUBLICATIONS

Leah Hunter, "L'Oréal's Latest Beauty Secret: It's Acting Like a Tech Company" Fast company Website, (https://www.fastcompany.com/3056231/loreals-latest-beauty-secret-its-acting-like-a-tech-company), Aug. 2, 2016, 8 Pages.

* cited by examiner

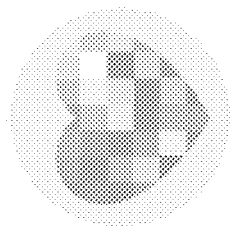 Pic 7-5
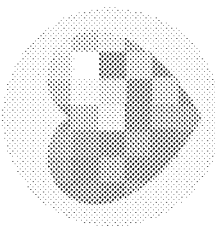 Pic 7-10
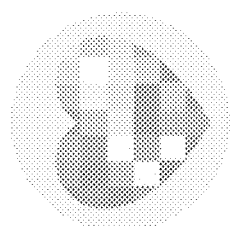 Pic 7-4
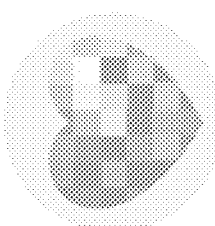 Pic 7-9
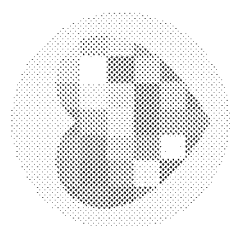 Pic 7-3
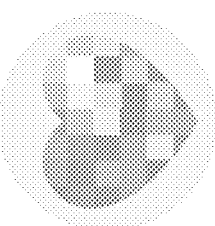 Pic 7-8
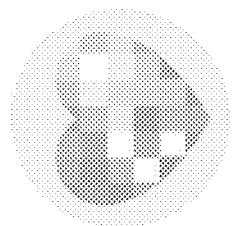 Pic 7-2
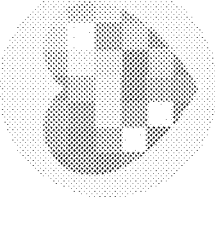 Pic 7-7
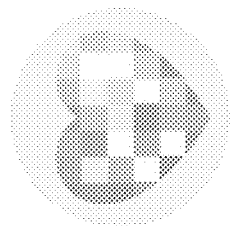 Pic 7-1
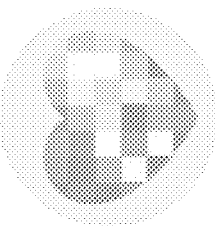 Pic 7-6
Fig. 7

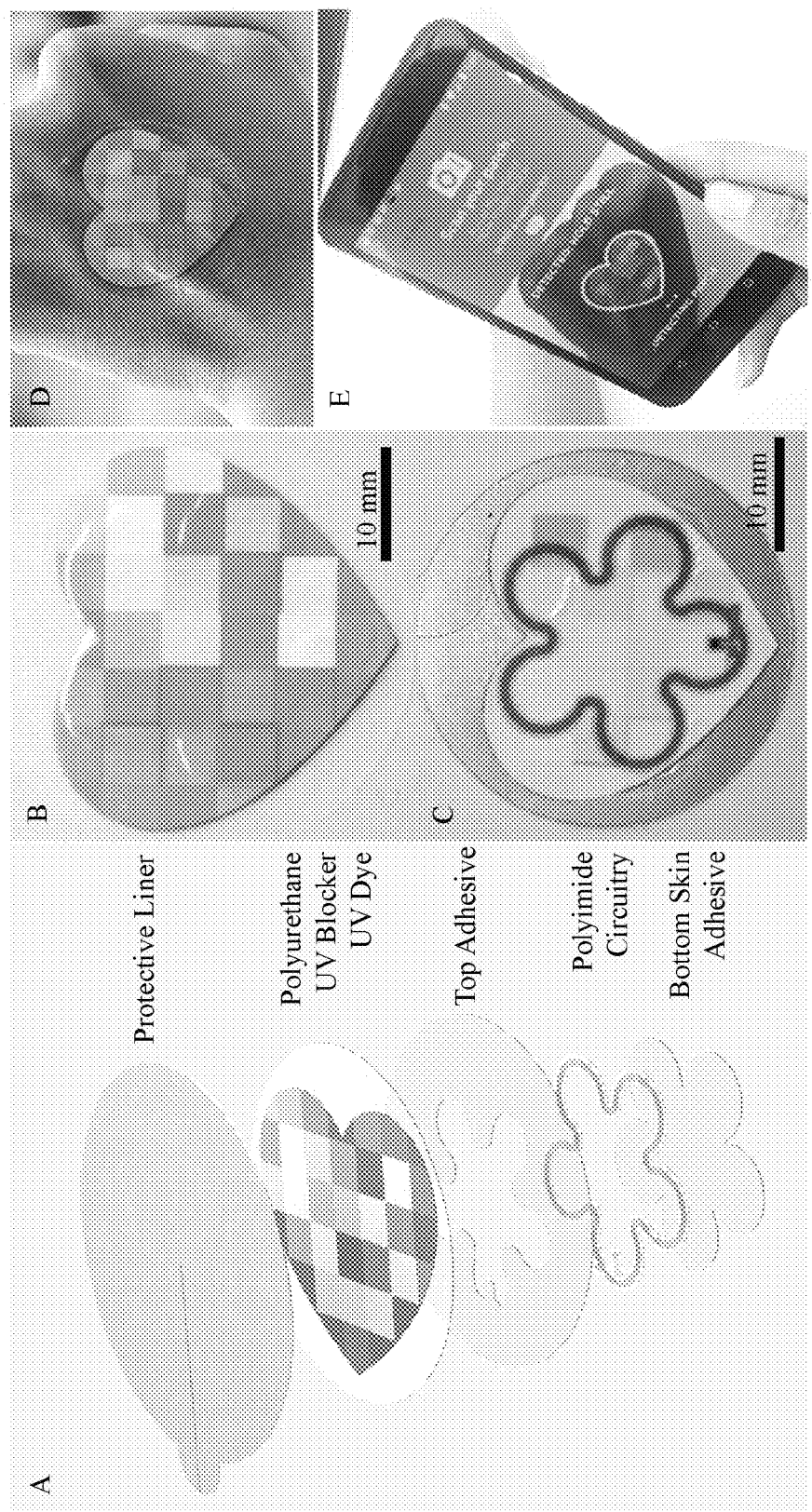
Figure 8: UV sensor structure

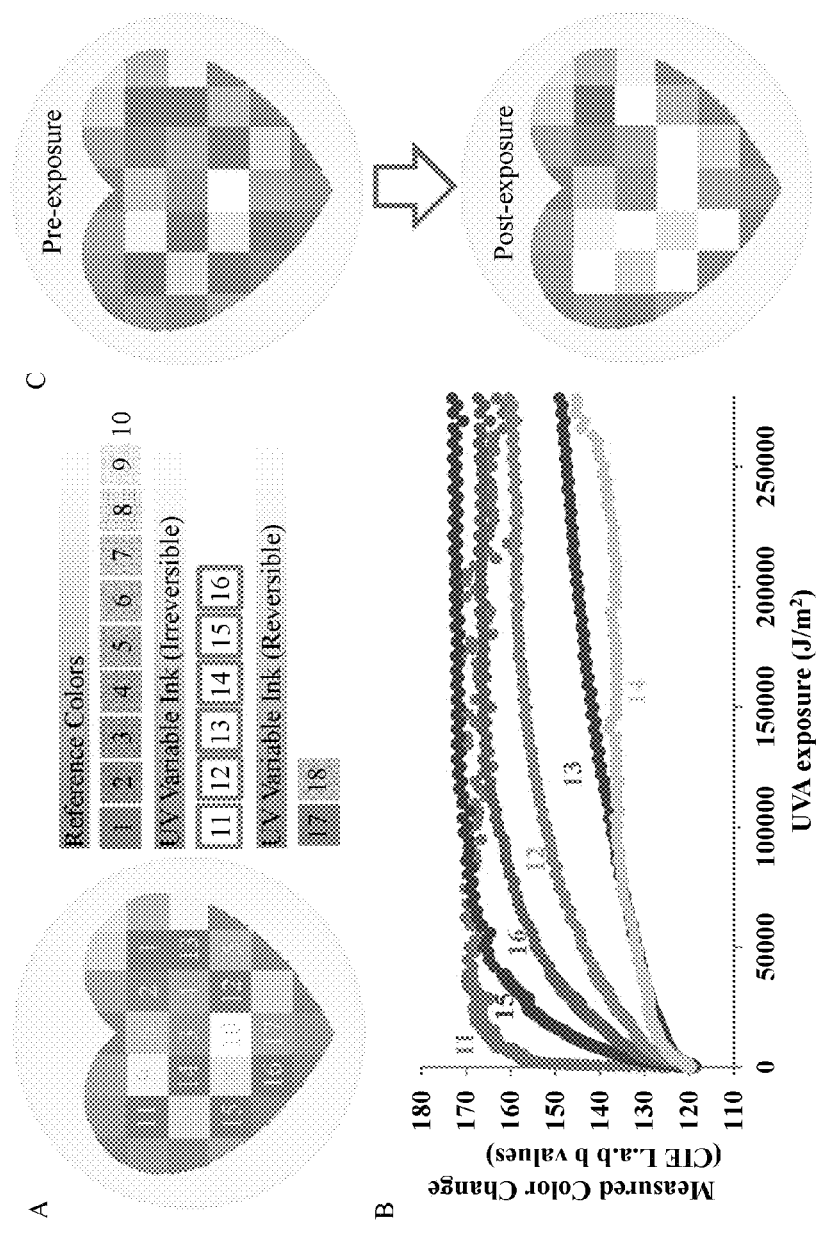
Figure 9: The mechanism of the UV sensor color change and color change quantification

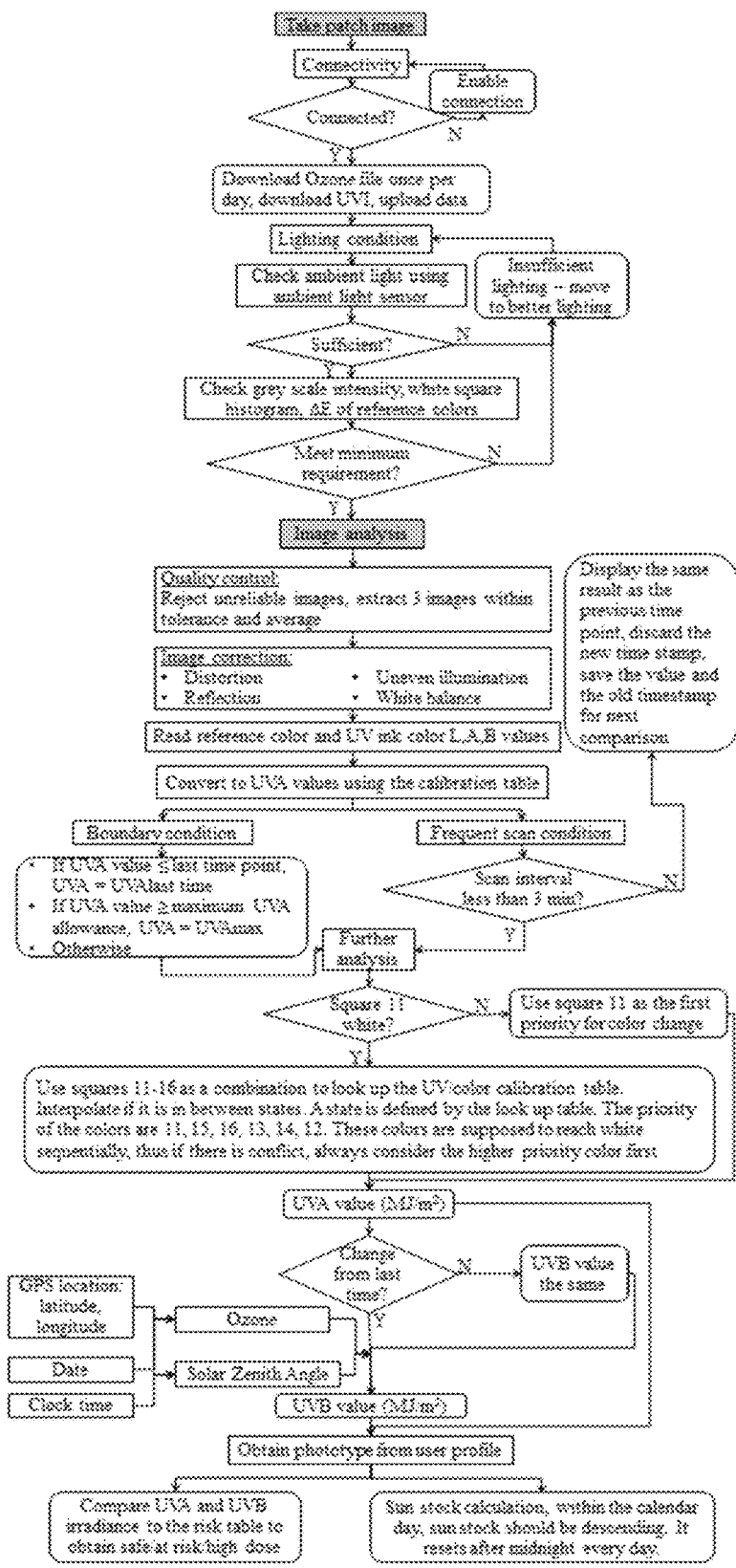
Figure 10: The app algorithm flowchart

| Skin Phototype | UV Daily Sunstock (MJ/m²) |
|---|---|
| 1 | 0.015 |
| 2 | 0.022 |
| 3 | 0.029 |
| 4 | 0.037 |
| 5 | 0.044 |
| 6 | 0.044 |

Table 1 Personal UV daily sunstock

Fig. 11A

| Skin Phototype | UV Risk (MJ/m²/hr) | | |
|---|---|---|---|
| | Safe Green Zone | At Risk Orange Zone | Too High Red Zone |
| 1 | <0.0015 | 0.015-0.003 | ≥0.003 |
| 2 | <0.0022 | 0.0022-0.0044 | ≥0.0044 |
| 3 | <0.0029 | 0.0029-0.0058 | ≥0.0058 |
| 4 | <0.0037 | 0.0037-0.0074 | ≥0.0074 |
| 5 | <0.0044 | 0.0044-0.0088 | ≥0.0088 |
| 6 | <0.0044 | 0.0044-0.0088 | ≥0.0088 |

Table 2 Personal UV risk determination

Fig. 11B

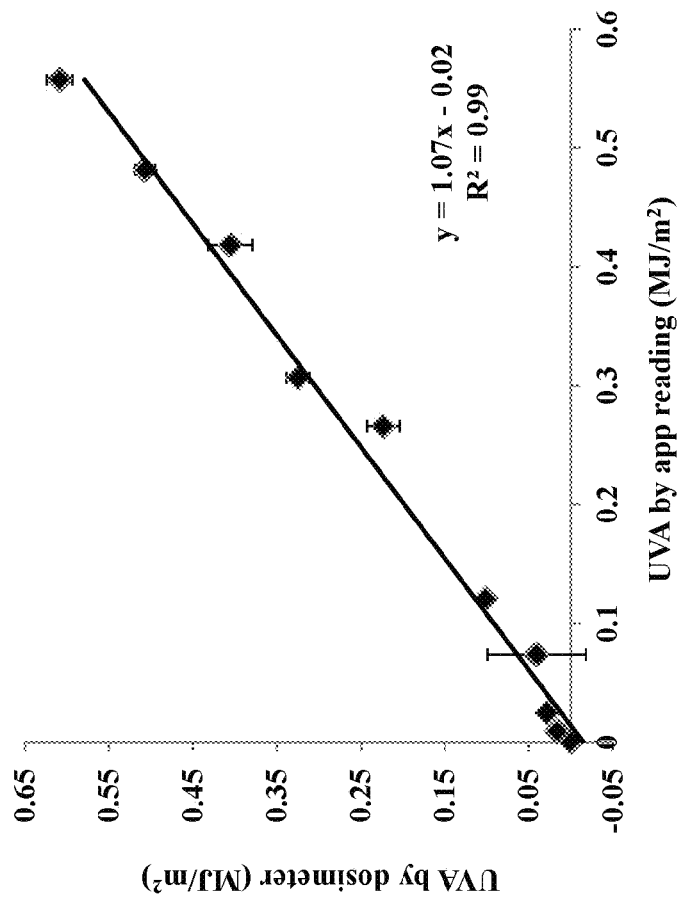
Figure 12: Comparison of the UV patch and Scienterra UV dosimeter.

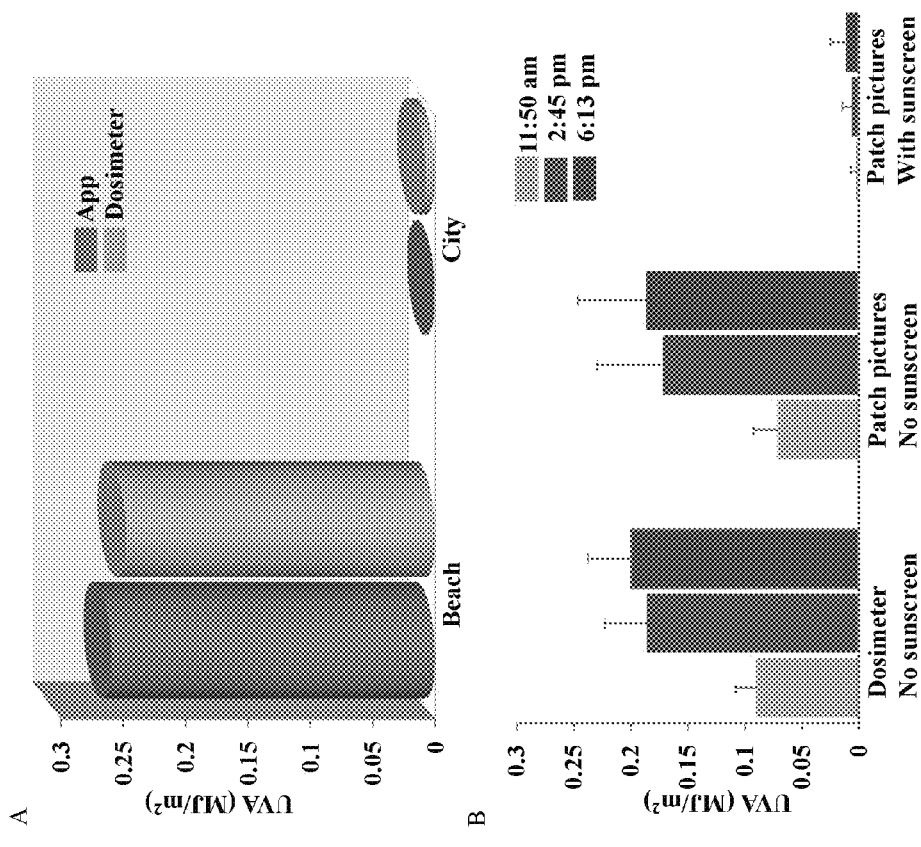
Figure 13 Clinical evaluation of the UV patch.

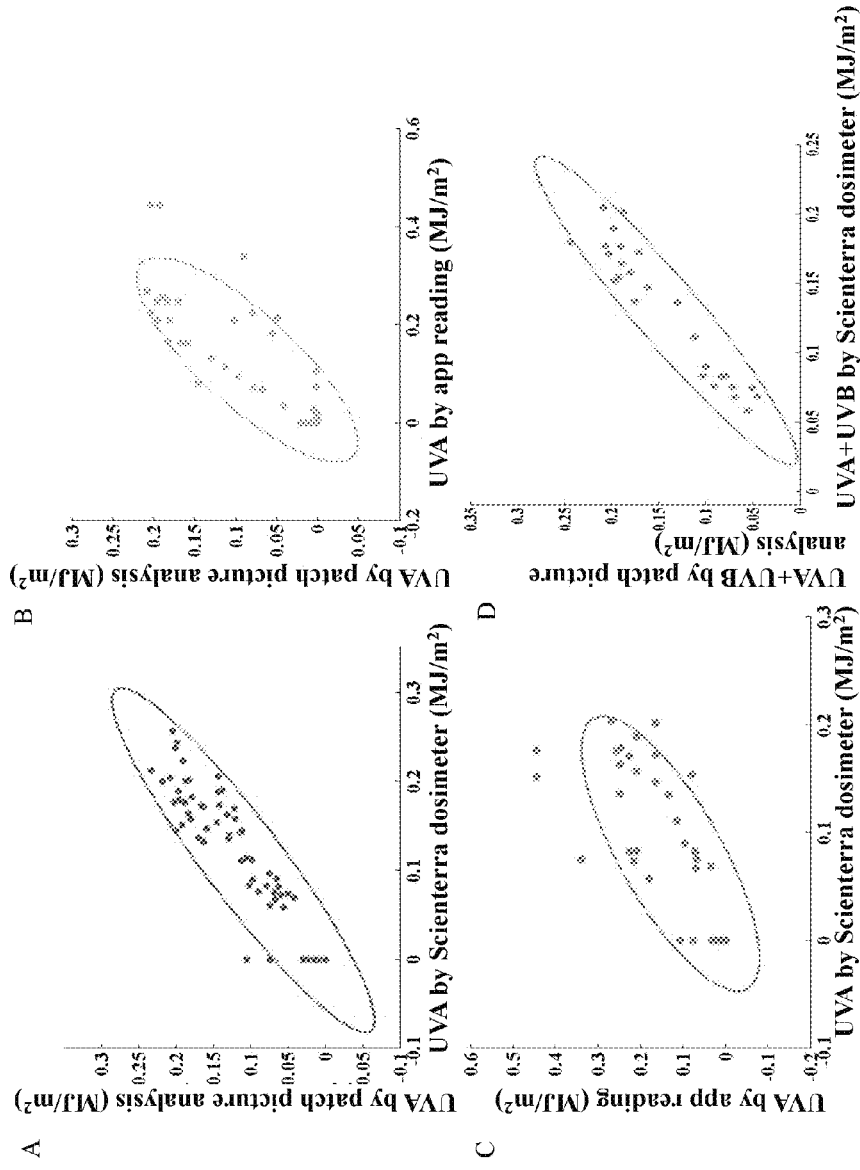
Figure 14: Comparison of UV readings among patch image analysis, Scienterra dosimeter and the mobile application

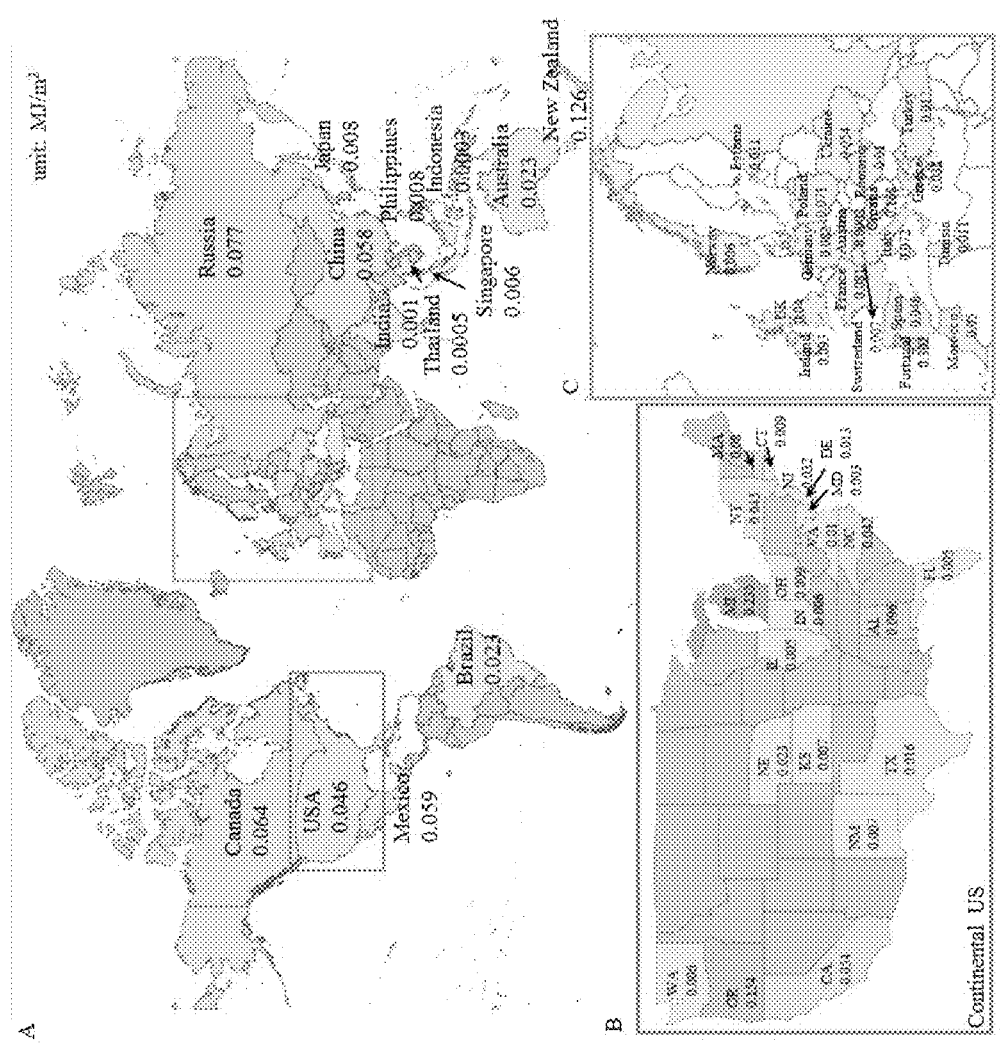
Figure 15: World average UV exposure

DEVICE AND SYSTEM FOR PERSONAL UV EXPOSURE MEASUREMENTS

CROSS-REFERENCE TO RELATED APPLICATIONS

This application is based upon and claims the benefit of priority to U.S. application Ser. No. 62/274,689, filed on Jan. 4, 2016, and U.S. Application No. 62/402,253, filed on Sep. 30, 2016, the entire contents of which are incorporated herein by reference.

BACKGROUND

Field

The present disclosure relates to a system and method for determining an amount of UV exposure for a particular user based on a detection of the UV exposure at a location of the user and specific information regarding the particular user.

Description of Related Art

Excessive ultraviolet (UV) radiation has acute and chronic effects on the skin, eye and immune system. Personalized monitoring of UV radiation is thus paramount to measure the extent of personal sun exposure, which could vary with environment, lifestyle, and sunscreen use.

UV radiation is essential for production of vitamin D and beneficial for human health, but over-exposure to UV has many associated risk factors, including skin cancer and photo-aging, even long after UV exposure ends. The acute effects of excessive UVA and UVB exposure are usually short-lived and reversible. Such effects include erythema, pigment darkening and sunburn. Prolonged exposures even to sub-erythemal UV doses result in epidermal thickening and degradation of keratinocytes, elastin, collagen and blood vessels, thus leading to premature skin aging. Clinical symptoms usually include increased wrinkling and loss of elasticity. Studies have also shown that both UVA and UVB radiation have local and systemic immunosuppressive properties, which is believed to be an important contributor to skin cancer development. UV-induced DNA damage is an important factor in developing all types of skin cancer including melanoma, non-melanoma skin cancers, basal cell carcinoma and squamous cell carcinoma. Both UVA and UVB are strongly scattered by air, aerosols, and clouds. For high sun angles, when most of the UV arrives, cloud effects are similar at UVA and UVB wavelengths; however, for low sun conditions, the UVB attenuation tends to be stronger. Unlike UVB, UVA penetrates glass windows and therefore may result in excessive UV exposures even in an indoor environment. In addition, UVA readily passes through the ozone layer resulting in higher intensities of the UVA portion of the solar spectrum at the earth surface. Continuous sunscreen protection and monitoring of personal UV exposures is therefore critical for better skin protection and prevention of skin cancer.

However, conventional wearable devices are rigid, bulky, and not compatible with sunscreens.

SUMMARY

In an embodiment, a device is provided that is configured to measure ultra-violet (UV) radiation exposure, comprising: a surface that includes a plurality of different sections that each have a different sensitivity to UV radiation exposure, wherein each of the plurality of different sections are configured to display a different color in response to the UV radiation exposure.

In an embodiment, the plurality of different sections include a different UV responsive chemical deposited thereon. In an embodiment, the UV responsive chemical is a UV responsive ink.

In an embodiment, the plurality of different sections include a different UV responsive electrical element.

In an embodiment, an area to display a plurality of different fixed reference colors to each indicate a different corresponding UV exposure level.

In an alternative embodiment, a system is provided for determining personal ultra-violet (UV) radiation measurements, comprising: a measurement device configured to measure UV irradiation; and a terminal device configured to receive or capture an output of the measured UV irradiation from the measurement device and to determine a specific user's personal UV exposure risk level based on at least the measured sun irradiation and information of a skin type of the specific user.

In an embodiment, the measurement device includes a surface that includes a plurality of different sections that each have a different sensitivity to UV radiation exposure, wherein each of the plurality of different sections are configured to display a different color in response to the UV radiation exposure, and the terminal device includes an image capturing device configured to capture an image of the plurality of different sections as the captured output of the measured UV radiation, and processing circuitry configured to determine the measured UV radiation based on performing image analysis of the captured image.

In an embodiment, the terminal device is configured to receive information from an external device of a personal UV dose amount for the specific user based on at least the information of the skin type of the user and the measured UV irradiation.

In an embodiment, the terminal device is configured to output a recommended method of protection based on the determined personal UV exposure risk level of the specific user.

In an embodiment, a system is provided for determining personal ultra-violet (UV) radiation measurements, comprising: a measurement device configured to measure UV irradiation; and a terminal device configured to receive or capture an output of the measured UV irradiation from the measurement device and to determine a specific user's personal UV exposure risk level based on at least the measured sun irradiation and information of a skin type of the specific user.

In an embodiment, the measurement device includes a surface that includes a plurality of different sections that each have a different sensitivity to UV radiation exposure, wherein each of the plurality of different sections are configured to display a different color in response to the UV radiation exposure, and the terminal device includes an image capturing device configured to capture an image of the plurality of different sections as the captured output of the measured UV radiation, and processing circuitry configured to determine the measured UV radiation based on performing image analysis of the captured image.

In an embodiment, the terminal device is configured to receive information from an external device of a personal UV dose amount for the specific user based on at least the information of the skin type of the user and the measured UV irradiation.

In an embodiment, the plurality of different sections include a different UV responsive chemical deposited thereon.

In an embodiment, the UV responsive chemical is a UV responsive ink.

In an embodiment, the plurality of different sections include a different UV responsive electrical element.

In an embodiment, the image analysis includes at least one of a) a shape recognition and features location algorithm; b) a lighting condition correction algorithm; c) a color quantification algorithm; and d) a UV dose determination algorithm.

BRIEF DESCRIPTION OF FIGURES

The patent or application file contains at least one drawing executed in color. Copies of this patent or patent application publication with color drawing(s) will be provided by the Office upon request and payment of the necessary fee.

FIG. 7 shows UV patch examples corresponding to different UV values.

FIG. 8 shows a UV sensor structure. (A) Construction of the UV sensor (from the top to the bottom): protective liner with adhesive, permeable polyurethane (TPU, 16 μm) with printed UV ink, UV blockers and reference colors, top skin adhesive layer (25 μm), NFC antenna (yellow, 18 μm) and a polyimide film (PI, 12.7 μm), NFC tag (0.5 mm), polyethylene terephthalate layer (PET, 12 μm), bottom skin adhesive layer (25 μm), and bottom liner. (B) The front of the UV sensor patch. (C) The back of the UV sensor patch. Bar=10 mm. (D) Wearing the UV sensor patch on the back of one's hand. (E) Reading the UV sensor patch using the My UV Patch app.

FIG. 9 shows the mechanism of the UV sensor color change and color change quantification. (A) The UV sensor patch is composed of a series of reference colors 1 to 10, UV variable ink squares 11 to 16, and UV reversible ink squares 17 and 18. The reference colors 1-10 correspond to the different colors of the UV ink squares when they are exposed to UV radiation. (B) The six UV sensitive ink squares change colors at distinctive rates when exposing to UVA radiation with square 11 being the most sensitive and square 16 the least sensitive. The color change is quantified in CIE Lab color space. (C) Schematics showing the UV sensor patch before and after exposure to UVA radiation.

FIG. 10 shows he app algorithm flowchart.

FIGS. 11A and 11B show Table 1 (Personal UV daily sunstock) and Table 2 (Personal UV risk determination).

FIG. 12 shows a comparison of the UV patch and Scienterra UV dosimeter.

FIG. 13 shows a clinical evaluation of the UV patch. (A) The study subjects wore the UV patches and Scienterra dosimeters during regular city and beach activities. Both devices showed agreement in UV dose measurements. (B) The study subjects conducted controlled activity: single file walk in specified directions. The activity was repeated in the morning, afternoon, and evening. Each study subject wore one Scienterra dosimeter and two UV patches: one without sunscreen and the other one with sunscreen applied on it. Both the electronic dosimeter and the UV patch without sunscreen showed consistent results. The patch covered with sunscreen showed significant reduction in measured UV radiation.

FIGS. 14A, 14B, 14C and 14C show a comparison of UV readings among patch image analysis, Scienterra dosimeter and the mobile application. UVA readings by patch picture analysis showed good correlation with Scienterra dosimeter readings, which validates the UV sensor image technique (B). When compared between the patch picture analysis and app reading, it still shows good correlation but fast patch scanning requirement for improved user experience affected data quality (B). Similar result is shown between Scienterra dosimeter and app reading (C). The total UV dose shows a good correlation between the Scienterra dosimeter and patch picture analysis (D). The 95% prediction ellipse is shown. The strong correlation among the three measurements further validates the sensor system.

FIG. 15 shows an example of world average UV exposure. (A) A world average UV exposure is generated based on the My UV Patch app user data from Jun. 6, 2016 to Aug. 18, 2016 (FIG. 7A). Zoom in maps are shown for continental US (B) and part of Europe (C). The country and state that contributed the data are labeled in yellow to red, color map is generated by normalizing the UV exposures to range between 0 (minimum UV exposure, yellow) and 1 (maximum UV exposure, red).

DETAILED DESCRIPTION

Figure 1:
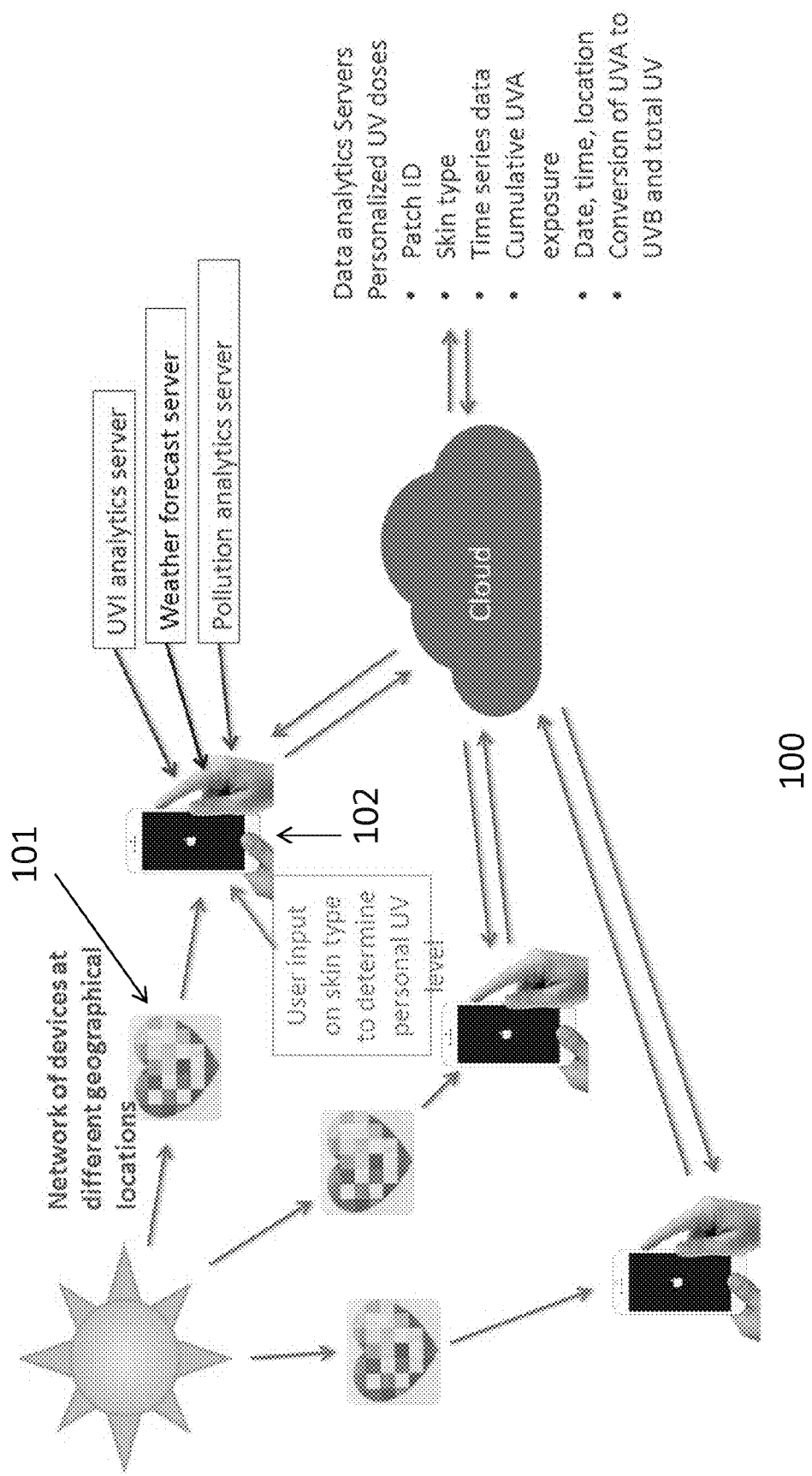
FIG. 1 illustrates a system for personal UV exposure measurements.

FIG. 1 illustrates a system 100 for personal UV exposure measurements. It can be seen that the system includes one or more measurement devices 101 which may be at different geographical locations. Each of the devices 101 may connect to a user device 102, which may be a computer, tablet, personal digital assistant, or smartphone. The device 101 may be referred to as a "patch" throughout this description, and it is configured to be attached to a skin surface of the user. The user device is configured to receive an input from the user on the user's skin type in order to determine personal UV level. The user device is also configured to receive inputs from external servers (via an internet connection, for example) such as UVI analytics server, a weather forecast server, and/or a pollution analytics server. The user device is further configured to connect to a cloud computing environment which is connected to data analytics servers for determining personalized UV doses for the user based on information provided by the user device according to the above-noted inputs. For instance, the data analytics servers may determine a personalized UV dose for the user based on one or more of a Patch ID, skin type, time series data cumulative UVA exposure, date/time/location information, and conversion of UVA to UVB and total UV. In another configuration, the device 102 may determine a personalized UV dose for the user based on one or more of a Patch ID, skin type, time series data cumulative UVA exposure, date/time/location information, and conversion of UVA to UVB and total UV.

Figure 2:
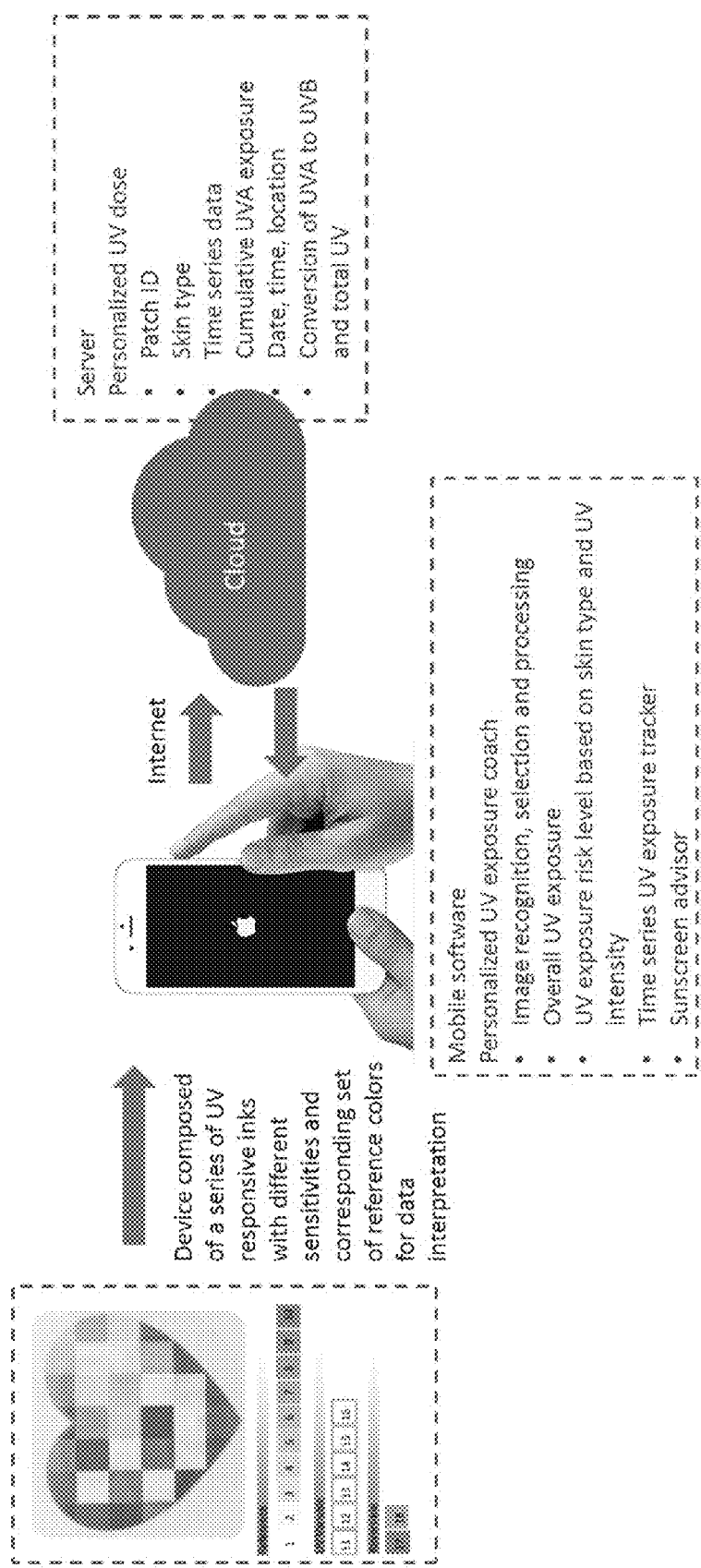
FIG. 2 provides additional details regarding the system.

FIG. 2 provides additional details regarding the system 100. FIG. 2 illustrates that the measurement device 101 may be composed of a series of UV responsive inks with different sensitivities and corresponding set of reference colors for data interpretation. A non-limiting example of a UV responsive ink is CR234-BT2B by Spectra Group Limited. However, the embodiments are not limited to using a chemical UV detection element, and the device 101 may use an electrical UV responsive element such as a UV diode or photodiode.

FIG. 2 further illustrates that the device 102 may be programmed with mobile software that provides a personalized UV exposure "coach" that provides one or more of image recognition, selection and processing; overall UV exposure; UV exposure risk level based on skin type and UV intensity; a time series UV exposure tracker; and a sunscreen advisor.

An operation of the system is as follows. Interrogated by the sun, the device 101 measures changes due to sun irradiation by means of chemical or electrical change. Mobile devices 102 are used to read such changes and convert to UV doses. Users use the mobile devices to communicate with cloud/server to upload personal information and download information for personal UV calculation. The cloud/server collects personalized information that includes date, time, location, skin type, and UV (UVA, UVB, UVI levels).

Figure 3A:
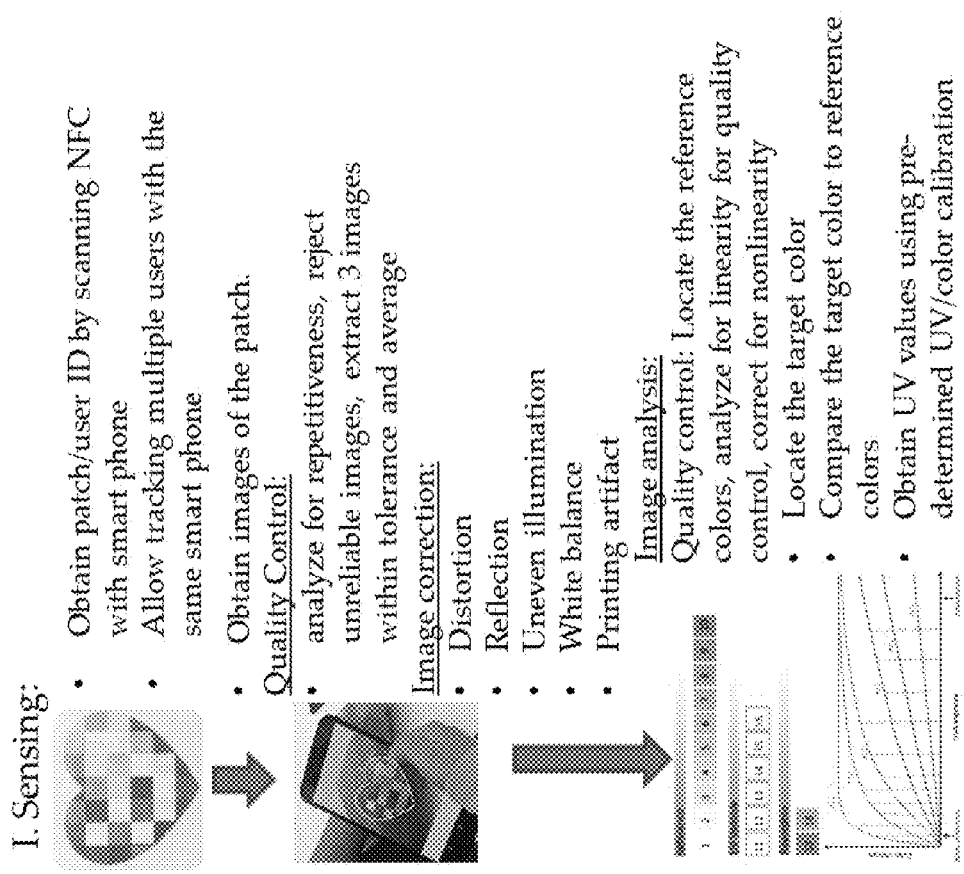
FIGS. 3A and 3B illustrate a series of processes performed in the system.
Figure 3B:
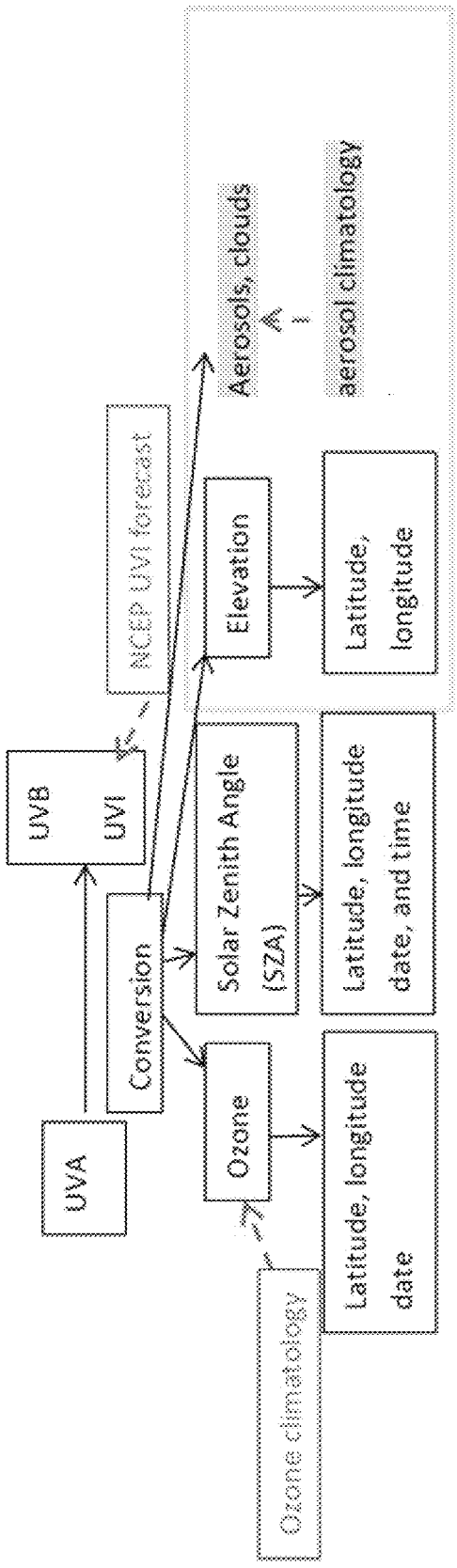

FIGS. 3A-3B illustrate a series of processes performed in the system. In a "sensing" phase I shown in FIG. 3A, a patch/user ID is obtained by scanning a NFC tag on the device 101/patch with the smart phone 102. The system allows for tracking multiple users with the same smart phone by scanning different patches. Then, images of a respective patch are obtained by the smartphone image capturing device (camera) function.

The smartphone is configured to perform quality control by analyzing for repetitiveness and rejecting unreliable images. The smartphone is configured, for example, to extract 3 images within a certain tolerance and average.

The smartphone is further configured to perform image correction on the captured image of the patch by correcting distortion, reflection, uneven illumination, white balance, or a printing artifact.

The smartphone is further configured to perform image analysis. For instance, image analysis can be used to provide quality control by locating the reference colors on the patch, analyzing for linearity for quality control, and correcting for nonlinearity. More specifically, the smartphone performs image analysis to locate the target color, compare the target color to reference colors, and obtain UV values using pre-determined UV/color calibration.

Phase II of FIG. 3B shows an algorithm of UVA/UVB conversion, which takes into account different factors such as Ozone climatology; solar zenith angle (SZA), elevation, and aerosol climatology, each of which may be based on one or more of latitude, longitude, and date/time of the device 101.

Figure 4:
FIG. 4 shows outputs of a user interface after all analyses are performed.

Phase III of FIG. 4 shows outputs of a user interface after all analyses are performed. For instance, an output may indicate whether or not the UV exposure for the user is considered safe, whether a sunscreen with a certain SPF is recommended, or if the UV levels are high or low on the given day.

A more detailed description of the method performed by the system is now provided bel.

UV Device Part 1: Extract Color Change

Figure 5:
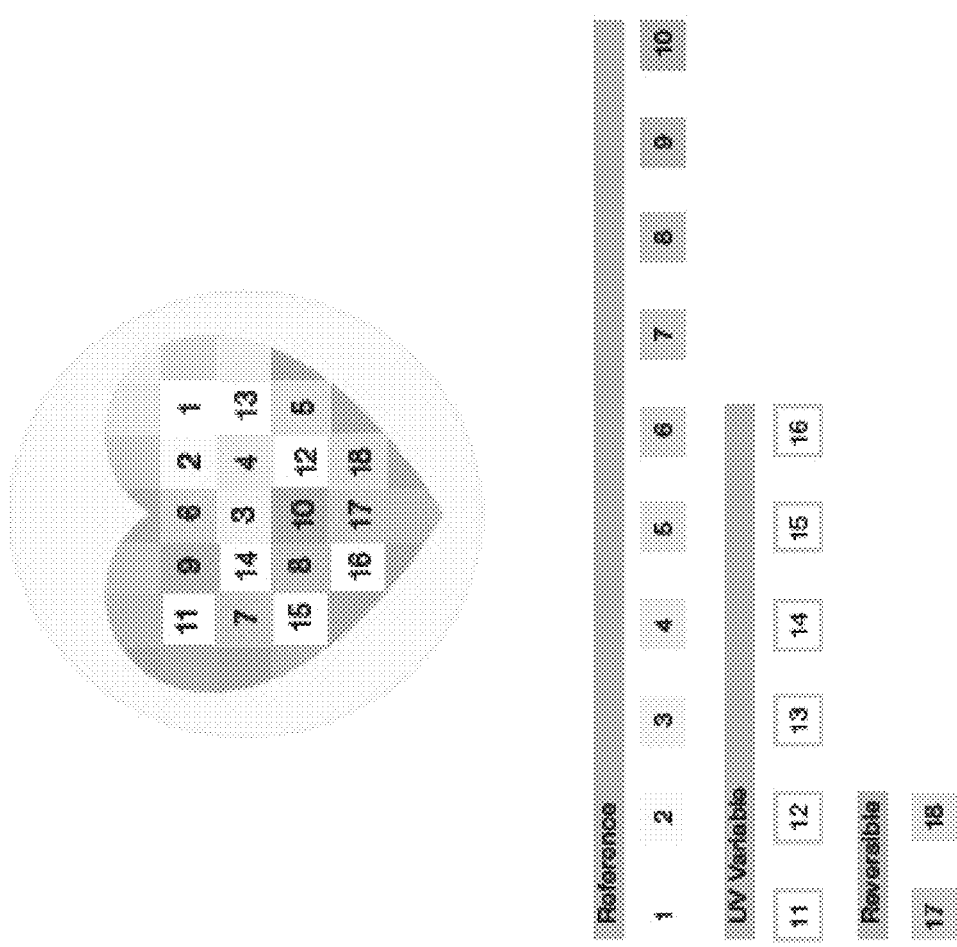
FIG. 5 shows examples of reference values for the color of each square of the UV patch.
Figure 6:
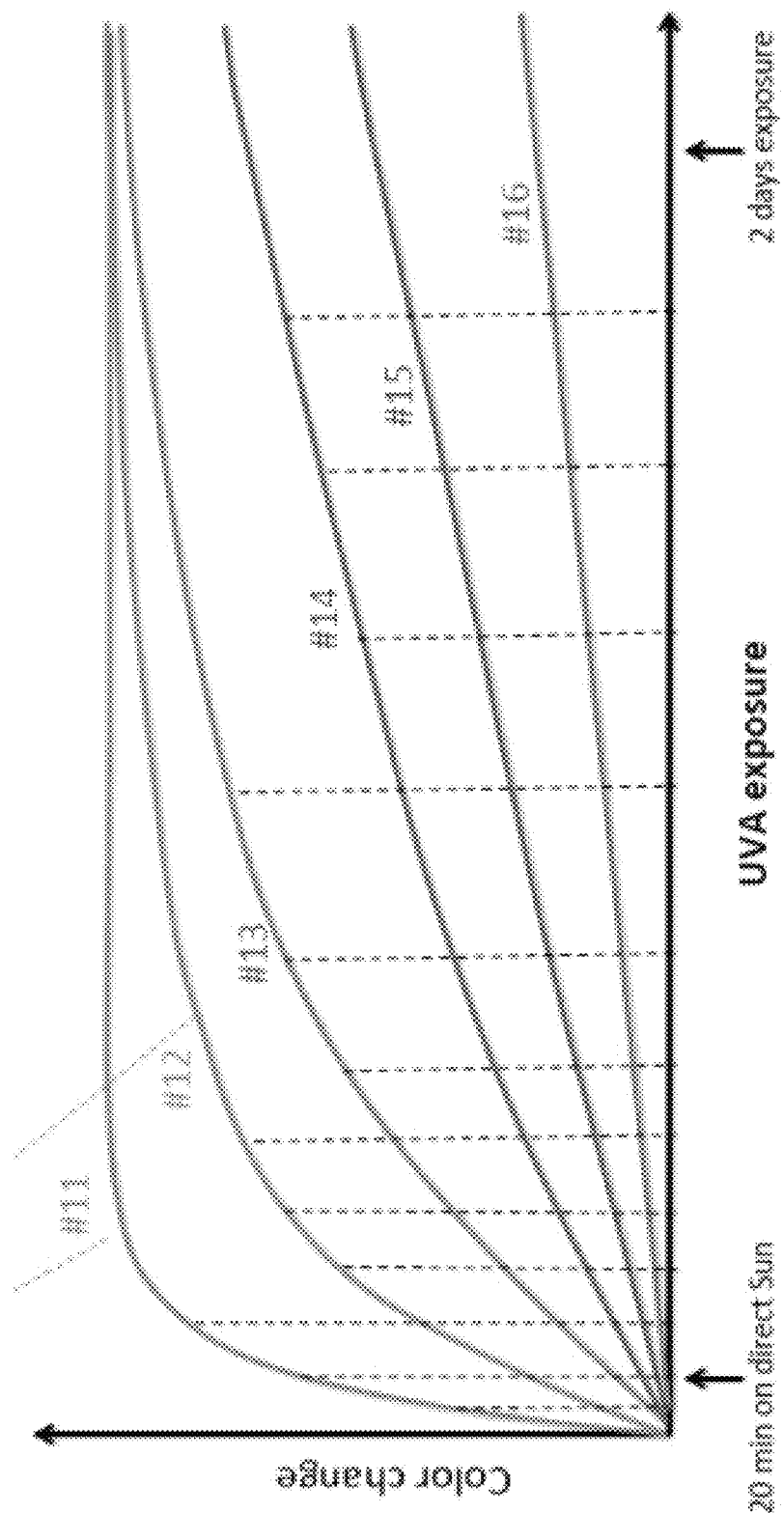
FIG. 6 shows examples of the color change of certain squares with an increase in UV exposure.

General Description:

The input is the picture taken by the cell phone camera. The color of each square (See FIG. 5) is represented in CIE L*a*b space (denoted as L, A, B), where a values are used for quantification. A value is a continuous number, format double-precision floating-point. Square 1 to 10 are reference colors, a value is increasing from 1 to 10 ($A_1<A_2<A_3<A_4<A_5<A_6<A_7<A_8<A_9<A_{10}$). Square 11 to 16 are UV variable colors (see also FIG. 6), where $A_{11}>=A_{12}>=A_{13}>=A_{14}>=A_{15}>=A_{16}$, $A_{10}>=A_{11}$, $A_{12}$, $A_{13}$, $A_{14}$, $A_{15}$, $A_{16}>=A_1$. Square 17 and 18 are reversible UV variable colors, $A_{10}<=A_{17}$, $A_{18}<=A_1$. $A_{11}$-$A_{16}$ will be compared to $A_1$-$A_{10}$, and find a match, $A_i-\Delta<=A_j<=A_i+\Delta$, (j=11, 12, ..., 16, i=1, 2, ..., 10, $\Delta$ is equal or less than half of the deviation between two adjacent colors). The output is the UV exposure, which is pre-determined by a look up table as follows:

|  | $A_1$ | $A_2$ | $A_3$ | $A_4$ | $A_5$ | $A_6$ | $A_7$ | $A_8$ | $A_9$ | $A_{10}$ |
|---|---|---|---|---|---|---|---|---|---|---|
| $A_{11}$ | $UV_{11,1}$ | $UV_{11,2}$ | $UV_{11,3}$ | $UV_{11,4}$ | $UV_{11,5}$ | $UV_{11,6}$ | $UV_{11,7}$ | $UV_{11,8}$ | $UV_{11,9}$ | $UV_{11,10}$ |
| $A_{12}$ | $UV_{12,1}$ | $UV_{12,2}$ | $UV_{12,3}$ | $UV_{12,4}$ | $UV_{12,5}$ | $UV_{12,6}$ | $UV_{12,7}$ | $UV_{12,8}$ | $UV_{12,9}$ | $UV_{12,10}$ |
| $A_{13}$ | $UV_{13,1}$ | $UV_{13,2}$ | $UV_{13,3}$ | $UV_{13,4}$ | $UV_{13,5}$ | $UV_{13,6}$ | $UV_{13,7}$ | $UV_{13,8}$ | $UV_{13,9}$ | $UV_{13,10}$ |
| $A_{14}$ | $UV_{14,1}$ | $UV_{14,2}$ | $UV_{14,3}$ | $UV_{14,4}$ | $UV_{14,5}$ | $UV_{14,6}$ | $UV_{14,7}$ | $UV_{14,8}$ | $UV_{14,9}$ | $UV_{14,10}$ |
| $A_{15}$ | $UV_{15,1}$ | $UV_{15,2}$ | $UV_{15,3}$ | $UV_{15,4}$ | $UV_{15,5}$ | $UV_{15,6}$ | $UV_{15,7}$ | $UV_{15,8}$ | $UV_{15,9}$ | $UV_{15,10}$ |
| $A_{16}$ | $UV_{16,1}$ | $UV_{16,2}$ | $UV_{16,3}$ | $UV_{16,4}$ | $UV_{16,5}$ | $UV_{16,6}$ | $UV_{16,7}$ | $UV_{16,8}$ | $UV_{16,9}$ | $UV_{16,10}$ |

Where $UV_{j,i}$ is a continuous number, format double-precision floating-point. (j=11, 12, ..., 16, i=1, 2, 3, ..., 10). For the squares 11 to 16, the readout will be $UV_{11,i11}$; $UV_{12,i12}$; $UV_{13,i13}$; $UV_{14,i14}$; $UV_{15,i15}$; $UV_{16,i16}$. The final output UV value will be the intersection of $UV_{11,i11}$; $UV_{12,i12}$; $UV_{13,i13}$; $UV_{14,i14}$; $UV_{15,i15}$; $UV_{16,i16}$. The specific calculation is described below.

Protocol:

1. Take clear pictures using the auto-focus function from the camera

2. Extraction of the "heart" from the image, rescale the image to the pre-existing template, locate the reference colors a. Highlight a box for the "heart" to be within the box b. If it fails to extract the "heart", it asks for retaking an image 3. Pre-process the image: white balance correction, and identify illuminants 4. Read the reference color (1-10) L, A, B values (mean) $A_1$, $A_2$, $A_3$, $A_4$, $A_5$, $A_6$, $A_7$, $A_8$, $A_9$, $A_{10}$, run a linearization of the L, A, B values with pre-stored standard values. A value is a continuous number, format double-precision floating-point. In pic1, they are 128, 129, 134, 136, 139, 141, 145, 147, 151, 153.

a. If there are too many outliers, the picture is not evenly illuminated, ask for retaking the image.

b. $A_1<A_2<A_3<A_4<A_5<A_6<A_7<A_8<A_9<A_{10}$, if not, the picture has over-exposure or under-exposure.

UV Device Part 2: Algorithm to Convert Color Change to UVA and UVB

5. A pre-determined look up table is extracted as follows: UV (unit: MJ/m2)

|          | $A_1$ | $A_2$  | $A_3$ | $A_4$  | $A_5$ | $A_6$  | $A_7$ | $A_8$  | $A_9$ | $A_{10}$ |
|----------|-------|--------|-------|--------|-------|--------|-------|--------|-------|----------|
| $A_{11}$ | 0     | 0.0005 | 0.001 | 0.0015 | 0.002 | 0.0025 | 0.003 | 0.0035 | 0.004 | 0.005    |
| $A_{12}$ | 0     | 0.005  | 0.006 | 0.008  | 0.01  | 0.012  | 0.014 | 0.016  | 0.018 | 0.02     |
| $A_{13}$ | 0     | 0.01   | 0.02  | 0.03   | 0.035 | 0.04   | 0.045 | 0.05   | 0.055 | 0.06     |
| $A_{14}$ | 0     | 0.03   | 0.06  | 0.08   | 0.1   | 0.12   | 0.14  | 0.16   | 0.18  | 0.2      |
| $A_{15}$ | 0     | 0.1    | 0.2   | 0.3    | 0.35  | 0.4    | 0.45  | 0.5    | 0.55  | 0.6      |
| $A_{16}$ | 0     | 0.3    | 0.6   | 0.7    | 0.75  | 0.8    | 0.85  | 0.9    | 0.95  | 1        |

6. Read the UV variable values (11-16) L, A, B values (mean), $A_{11}$, $A_{12}$, $A_{13}$, $A_{14}$, $A_{15}$, $A_{16}$, where $A_{11}>=A_{12}>=A_{13}>=A_{14}>=A_{15}>=A_{16}$, $A_{10}>=A_{11}$, $A_{12}$, $A_{13}$, $A_{14}$, $A_{15}$, $A_{16}>=A_1$, compare the values to $A_1, \ldots, A_{10}$, and find a match, $A_j-\Delta<=A_j<=A_i+\Delta$, (j=11, 12, ..., 16, i=1, 2, ..., 10, $\Delta$ is equal or less than half of the deviation between two adjacent colors).

If $A_j>=A_{10}$, $UV_j>=UV_{j,10}$

Else if $A_j<=A_2$, $UV_j<=UV_{j,2}$

Else if $A_i<=Aj<=A_{i+1}$ (i=1, ..., 9)

$UV_j$=linear interpolation between $UV_{j,i}$ and $UV_{j,i+1}$

Please see the test images in FIG. 7, pic 7-1 corresponds to UV 0.001, pic 7-2 corresponds to UV 0.01, pic 7-3 corresponds to UV 0.1, pic 7-4 corresponds to UV 0.02, pic 7-5 corresponds to UV 0.3, pic 7-6 corresponds to UV 0.005, pic 7-7 corresponds to UV 0.05, pic 7-8 corresponds to UV 0.5, pic 7-9 corresponds to UV 0.8, pic 7-10 corresponds to UV 1.2 (should have a readout>=1)

7. Under ideal conditions, $UV_{11,i11}$; $UV_{12,i12}$; $UV_{13,i13}$; $UV_{14,i14}$; $UV_{15,i15}$; $UV_{16,i16}$ create 6 ranges that have an intersection, the intersection is the final UV readout.

If conflicts happen, find the outlier by discarding one at a time. If the conflict resolves, use the 5 ranges to find an intersection. If there is more than 1 possibility, compare all the solutions as well as to the previous time points, if the new number is >=the previous number, it is a valid answer, if more than 1 solution is valid, obtain the middle value as the solution.

If conflicts still happen, find the outliers by discarding two at a time. If the conflict resolves, use the 4 ranges to find an intersection. Also compare to the previous time points, if the new number is >=the previous number, it is a valid answer.

If conflicts still happen, find the outliers by discarding three at a time. The 6 ranges now separate into two groups, compare to the previous time points, if the new number is >=the previous number, it is a valid answer, otherwise, it gives a warning message "unreliable measurement", and asks for retaking the picture.

8. The final UVA value is stored.

Part A: Core Algorithm for Conversion

The purpose of this part of algorithm is to obtain UVB measurement using measured UVA values, as illustrated in FIG. 3B.

UVA values are obtained from algorithm Part 1 listed above.

Figure 16:
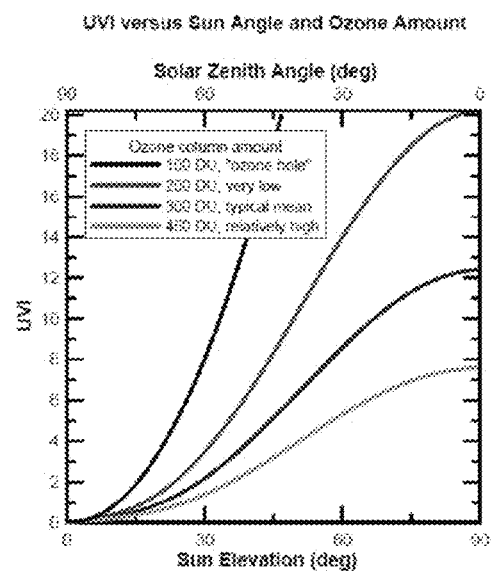
FIG. 16 shows a lookup table for conversion between UVA and UVB values.

1. Conversion between UVA and UVB can be achieved by a lookup table as shown on FIG. 16.

2. To obtain UVI, the above table uses Ozone and SZA, additional factors include elevation, aerosols condition, and cloud condition. Additional factors may be included in later versions.

3. Ozone is calculated from latitude, longitude and date. Ozone can also be obtained using Ozone climatology through historical data (less accurate).

4. Calculate the Solar Zenith Angle for a given day, time, latitude and longitude. Source code information: (www.planet-source-code.com/vb/scripts/ShowCode.asp?txtCodeId=43299&lngWId=1)

5. Latitude, longitude, elevation are obtained through GPS location

6. Time, date are obtained through synchronization with cell phone clock and time zone.

Part B: Mobile Software (App) Algorithm

1. Scan the patch
   a. If the phone has NFC reader, record NFC tag information
   b. If the phone does not have NFC reader, take the picture 2. Obtain GPS location file, time stamp and time zone.
   a. Record GPS location (Latitude, longitude, elevation). If GPS location is not available, use the previous GPS location, display a reminder of updating location
   b. In the case GPS location cannot be obtained, the app will use the last stored GPS location, and show an estimated calculation.
   c. Record time zone, and time (min/hour/day/month/year)
   d. The Time/Date stamps should be on UTC (i.e., GMT). All Time/Date stamps on NOAA files are in UTC (i.e., GMT). This will be consistent throughout the app.

3. Calculate the Solar Zenith Angle for a given day, time, latitude and longitude. Source code information: (www.planet-sourcecode.com/vb/scripts/ShowCode.asp?txtCodeId=43299&lngWId=1)

4. Ozone information may be obtained from a web service that downloads NOAA relevant grib2 files, convert the grib2 file into readable format, and parse the Ozone information for MSF to download.

For obtaining the right Ozone information, what is needed is:
1. Time zone
2. Latitude
3. Longitude Procedure for selection of Ozone file
1. Convert to UTC
2. If UTC time is later than 05:00, then the file has just been updated. Select the current day version.
3. If UTC time is earlier than 05:00, then the file was last updated yesterday. Select the yesterday's version, but the timestamp of the file you are getting needs to +24 hours to account for the one day difference.

Offline Mode:
1. The Ozone files downloaded by the app contains 3-day forecast (They are the 12 hours (noon), 60 hours (day 3) and 108 hours (day 5) by local time.
2. To find the right file, you need to use the time zone information.
3. In the offline mode, the app will use values from the last stored Ozone file (3 day forecast on day 1, 3, 5).
   a. The forecast is on day 1, 3, 5. Day 1 and 2 will use day 1's value, day 3 and 4 will use day 4's value, day 5 and 6 will use day 5's value.
   b. If the date is outside the forecast range, the app will run calculation based on the closest time, but display an estimated value in the offline mode.
   c. In an example file, the first line gives the forecast date (UTC), and the filename includes the number of hours after UTC that it applies to, (e.g., 00 hours in this case). The output is 10 values per line with 6516 lines, so that corresponds to a matrix of 360×181.). The first value is at longitude=0, the second at 1 degree East, the next 36 lines are for latitude 90N (and are all the same), starting at the next 36 lines are for latitude 89N etc . . . the last 36 lines are for latitude 90S. The first value is at longitude=0, the second at 1 degree East.

Procedure for Selection of Ozone File
   a. Convert current time to UTC time and date (UTC=GMT)
   b. Check for existence of the folder with 00GMT forecast files for that date (if the UTC time is later than 04:50 (time of creation of the file everyday), then the file should have just been updated, otherwise you'll need to use the forecast generated the previous day).
   c. Select the closest 3-hour version corresponding to noon for the current longitude, using the conversion (longitude/15 degrees).

| Example city | Longitude West of GMT 00 | Hours of delay from GMT 00 | If today's file exist (timestamp after 04:50 am UTC 00) Noon forecast times getting (*) | If today's file does not exist (timestamp before 04:50 am UTC 00) Noon forecast times getting the previous day (**) |
|---|---|---|---|---|
| London | 0 | 0 | 012, 060, 108 | 036, 084, 132 |
| New Orleans | 90 | 90/15 = 6 | 018, 066, 114 | 042, 090, 138 |
| Auckland, NZ | 180 | 180/15 = 12 | 000, 048, 096 | 024, 072, 120 |
| Calcutta | 270 | 270/15 = 18 | 006, 054, 102 | 030, 078, 126 |
| Berlin | 360 | 24 = 00 | 012, 060, 108 | 036, 084, 132 |

(*): These are the FFF in ftp://ftp.ncep.noaa.gov/pub/data/nccf/com/gfs/prod/gfs.2015110500/gfs.t00z.pgrb2.1p00.fFFF
(**): These are the FFF in ftp://ftp.ncep.noaa.gov/pub/data/nccf/com/gfs/prod/gfs.2015110400/gfs.t00z.pgrb2.1p00.fFFF 5. Conversion between UVA and UVB can be achieved by a lookup table
6. Definition of the UVB and UVA doses which can cause damage or not For UVB Part
   The different levels are defined based on the MED
   The dose at risk has been shown to be 0.5 MED, safe dose could be defined as 0.25 MED and too high dose as 1 MED
   MEDs can be expressed in pure UVB or total UV (UVB+UVA) ($mJ/cm^2$)
   Doses are adjusted depending on phototype.
   The lowest UV dose at risk for phototype I is 1835 $mJ/cm^2$ (about 100 $mJ/cm^2$ UVB and 1700 $mJ/cm^2$ UVA) that means that the patch should be sensitive to a dose of 2000 $mJ/cm^2$ For UVA Part
   The different levels are based on the UVA dose threshold able to induce damage
   UVA doses are expressed in $mJ/cm^2$
   The dose at risk has been shown to be 15000 $mJ/cm^2$, safe dose could be defined as 7500 $mJ/cm^2$ and too high dose as 20000 $mJ/cm^2$
   There is no adjustment with the phototype (no significant difference)

The above-described system and algorithm can adapted for other forms of input that may be provided by the measurement device 101 (e.g. other chemical, electrochemical, electrical, etc.)

UV Patch Sensor Additional Details

While an overall system and algorithm were described above, below is a detailed description of the UV patch according to an embodiment. Here, we demonstrate an ultralow modulus, stretchable, skin-mounted UV patch that measures personal UV doses. The patch contains functional layers of ultrathin stretchable electronics and a photosensitive patterned dye that reacts to UV light. Color changes in the photosensitive dyes correspond to UV light intensity and are analyzed with a smartphone camera. A software application on the smartphone has feature recognition, lighting condition correction, and quantification algorithms that detect and quantify changes in color. These changes in color are then correlated to corresponding shifts in UV dose, and compared to existing UV dose risk levels. The soft mechanics of the UV patch allow for multiday wear in the presence of sunscreen and water. Two clinical studies serve to demonstrate the utility of the UV patch during daily activities with and without sunscreen application.

It was noted above that conventional wearable devices are rigid, bulky, and not compatible with sunscreens. Recent development in material and power management enables integrated sensor system in more compact form. Here we report on the design and development of a wearable, ultrathin, stretchable, and breathable UV sensor for accurate quantification of personal UV exposures and quantification of sunscreen protection. The ultra-thin patch structure and elastic properties allow for conformal contact with the skin and continuous wear for up to 5 days. The patch is emollient and sunscreen compatible, allowing for skin care product and sunscreen application. It contains dyes that change color upon exposure to UV radiation. This color change is then quantified using a smartphone app and quantification algorithm. The algorithm uses a system of reference colors to allow for accurate quantification of the color change under different lighting conditions. In order to determine personal UV exposure levels and provide accurate personalized recommendations, the algorithm takes into account many parameters. First, the color change is converted to UVA radiation based on predetermined calibration tables that link color change to the amount of UVA radiation. Second, the corresponding UVB exposure is calculated using a precomputed lookup table that gives the conversion factor as a function of the column amount of ozone in the atmosphere and sloar zenith angle (SZA). GPS location of the user is determined and based on the user location and time SZA is calculated. Longitude, lattitude and time is also used to extract the forecast ozone amount from satellite-measurements.

We tested the sensor in two clinical evaluation studies. The first study demonstrated device functionality in different real life activities including swimming in the ocean, beach activities, showering, as well as compatibility with sunscreen and skin care product applications. It also helped us to further optimize and calibrate the device for accurate UV dose measurements. The second study demonstrated patch UV readout accuracy during controlled and real life daily activities.

Experimental Results

Patch Design:

The UV patch is designed to conform to the skin surface, mimics skin mechanical properties and interaction with sunscreens. When the patch is attached to the skin, it experiences similar UV radiation as the surrounding skin. An exposure to UV radiation results in patch color change, which is quantified using a smartphone app (FIG. 8). The UV sensing mechanism is composed of UV sensitive inks and blockers that are printed on a permeable polyurethane (TPU) film. Below the TPU, the patch contains a Near Field Communication (NFC) chip and copper/plyimide (PI) antenna for communication with a smartphone. A thin layer of polyethylene terephthalate (PET) prevents the NFC and antenna from directly contacting user's skin. Below the PET layer, there is a thin layer of skin adhesive that couple the UV patch with the skin (FIG. 8A).

UV Sensitive Dyes Design and Optimization

When exposed to UV radiation the patch changes color, which is quantified by image processing algorithms (FIG. 9). The UV patch is composed of ten reference color squares 1 to 10 and six irreversible UV sensitive ink squares 11 to 16 (FIG. 9A). The six UV variable ink squares were optimized to change color at progressively decreasing rates in order to cover broad sensitivity range. This also allows us to average readouts from multiple squares for better data accuracy (FIG. 9B). The ten reference colors are blue with 10 to 100% transparency by steps of 10%, respectively, with a minimum ΔE of 5 in between adjacent colors using the international commission on illumination's distance metric for colors. A UV sensor patch from pre-exposure to fully exposed to UV is shown in FIG. 9C. The UVA dosage is measured by quantifying the color change of the six UV variable ink squares. The image of the UV sensor patch is captured and processed by a cell phone app.

Algorithm Design

The app algorithm is design to determine user's skin sensitivity to UV. The app also determines user's location and the UV Index in the area. When the user scans the patch the app can calculates users personal UV doses and risk level and recommends sunscreen product that provides the best protection and comfort.

The algorithm for the personal UV dose quantification include 4 subalgorithms: a) shape recognition and features location algorithm; b) lighting condition correction algorithm; c) color quantification algorithm; d) UV dose determination algorithm (FIG. 10).

Shape Recognition:

The shape recognition algorithm is designed to automatically detect the patch shape and correct for any shape distortion. It then determines the location of all the UV sensitive squares and reference colors. Specifically, the first step is to determine whether a heart shape is present and its general position in the image, these are achieved by using Haar feature based cascade classifiers, which are trained using a large number of both positive images and negative images. The heart is then isolated from the image. The second step is to detect the shape more closely using feature matching, and further correct distortions using perspective control. Once the key points on the heart shape have been detected, the reference color squares and UV sensitive ink squares are then located using the template.

Lighting Correction:

The app takes multiple scans of the patch and every scan passes through a quality control process, which includes elimination of scans with uneven illumination and uneven light reflection. The images are then color corrected and white balance corrected. Only the best quality images are accepted and used for color quantification. Specifically, the colors are sampled from each reference color square and all UV sensitive ink squares. During the color sampling, the color histogram for each square is calculated and the center 50% of the pixel colors remain for further processing. This step is to remove wrinkles, light reflection and shadows resulting in reduced noise in the image. The sampled colors from each reference color squares are then compared to the "true color", which is pre-determined by the color code of the inks. The color correction is performed for each square and the same correction matrix is applied to its surrounding UV sensitive ink squares.

Color Quantification:

After the images are corrected for lighting condition, the algorithm takes measurements of the color of the UV sensitive dyes and compares them to the reference colors. The reference colors are closely matched to the color of the UV sensitive dyes and mimic UV dyes at different UV exposure levels. This allows for accurate color quantification at different lighting conditions, since any particular lighting condition affects the reference colors and UV dye colors to similar extent.

The image is processed in the International Commission on Illumination (Commission Internationale de l'eclairage) (CIE) Lab color space (L*a*b space), the ΔE between squares 11-16 (UV variable ink squares) and squares 1-10 (reference color squares) are calculated, respectively, using E.q. 1, where i=11, 12, 13, 14, 15, 16 denotes the UV variable ink squares; j=1, 2, 3, 4, 5, 6, 7, 8, 9, 10 denotes reference color squares. The conversion between the color and UVA values is through a look up table created during calibration and calculated using E.q. 2, where i=11, 12, 13, 14, 15, 16; j=1, 2, 3, 4, 5, 6, 7, 8, 9, 10. Specifically, the UV variable ink square is matched to the closest reference color square by comparing ΔE. The UVA is interpolated between the UVA values that correspond to the two closest reference colors (E.q. 2).

$$\Delta E_{i,j} = \sqrt{(L_i - L_j) + (a_i - a_j) + (b_i - b_j)}, \quad \text{(E.q. 1)}$$

$$\begin{cases} \text{if } \Delta E_{i,1} = \min_{j=1,\ldots,10} \Delta E_{i,j} \text{ and } \Delta E_{i,1} < & \text{(E.q. 2)} \\ \quad \text{threshold, } UVA_i = UVA_1, \\ \text{Else, } UVA_i = \dfrac{\Delta E_{i,j}^{-1} UVA_j + \Delta E_{i,j-1+1}^{-1} UVA_{j-1}}{\Delta E_{i,j}^{-1} + \Delta E_{i,j-+1}^{-1}}, \end{cases}$$

The boundary condition and minimal scanning frequency are set as FIG. 3 boundary condition and frequent scan condition. These are to further remove the noise of the readings.

UV Dose Determination:

In order to determine user's personal UV exposure levels and provide accurate recommendations, the algorithm takes into account many parameters. First, the color change is directly converted to UVA radiation based on predetermined calibration tables that link color change to UVA radiation. Second, the corresponding UVB exposure is calculated using a pre-computed lookup table that gives the conversion factor as a function of the column amount of ozone in the atmosphere and solar zenith angle (SZA). SZA is determined based on GPS location and time. The user latitude, longitude, and time is also used to extract the forecast ozone amount from satellite-measurements. In this conversion, the effects of clouds and aerosols are assumed to be similar at UVA and UVB wavelengths. It should be noted however, that for some organic aerosols (which are ubiquitous in densely populated areas) aerosol extinctions will generally be larger in the UVB region than in the UVA region. Thus the predicted UVB using this method will represent an upper limit. Ozone column amount data (measured in Dobson Units, DU, where 1 DU=$2.69 \times 10^{16}$ molecules per square centimeter), are extracted from daily global fields of ozone at the National Centers for Environmental Prediction at National Oceanic and Atmospheric Administration (NCEP/NOAA). UVA and UVB results are then cross-checked with the maximal values expected for the user location determined based on UVI forecasting webservices. Again, pre-computed lookup tables, which are functions of ozone and SZA, are used to relate the quantities. This process prevents sporadic and erroneous readouts. If internet connection is not available, the result is cross-checked with lookup tables that relate maximal UVI data with corresponding maximal values for UVA and UVB at different geographical locations and time.

Note that according to the CIE, the wavelength threshold between UVB and UVA is 315 nm.

Personal Daily Safe UV Doses and Risk Levels

The personal daily safe UV doses are calculated based on the skin phototype and minimal erythema dose (IVIED) (FIG. 11A, Table 1). The skin photo type is determined according to the Fitzpatrick phototyping scale, on a simplified user questionnaire completed by the user when the user first opens the app. The maximal daily safe UV dose is set to 0.4 MED for each skin phototype and it is based on studies demonstrating that some degree of UV induce skin damage can be observed after exposure to 0.5 MED.

The rate of change of the UV exposure throughout the day is defined as "exposure" and it is calculated for every scan for the time between the current and previous patch scan. It is divided into 3 zones: 1) Green—on track to stay within the daily safe UV dose; 2) Orange—at risk to exceed the daily safe UV dose; 3) Red—high risk of UV overexposure (FIG. 11B, Table 2).

Sensor Validation:

We used electronic Scienterra UV dosimeters as reference devices for the UV patch calibration. The Scienterra dosimeters were calibrated at the Solar Irradiance Monitoring Station at the National Renewable Energy Laboratory (NREL) (Davis, Calif., USA). The patch was then validated under natural sun light and under artificial light using an Advanced Beam Optics Design Class A+AA Solar Simulator Model TSS-156 with AM1.5G spectrum from 300 to 1800 nm (OAI Inc. USA). A strong correlation was demonstrated between the UV patch readings and the Scienterra UV dosimeter readings ($R^2$=0.99 at the range of 0 to 0.6 MJ/m$^2$; FIG. 12).

The patch was then evaluated on human volunteers in two clinical studies. The first 5-day study with 14 volunteers was designed to test device functionality in different real life activities including swimming, beach activities, showering, and compatibility with sunscreen and skin care product applications. The second study was designed to test the patch UV readout accuracy during controlled and real life daily activities. The subjects received an average of 0.2593±0.0499 MJ/m$^2$ UVA exposure from 10 am to 2 pm during the free beach activity, and 0.0000±0.0000 MJ/m$^2$ UVA exposure from 3 pm to 4 pm during the free city walk measured by the UV sensor patch app reading. The Scienterra dosimeters read similar values for the beach activity but higher values for city walk, 0.2479±0.0248 MJ/m$^2$ for the beach activity and 0.0078±0.0048 MJ/m$^2$ for the city walk, respectively (FIG. 13A). The UV sensor patch is compatible with sunscreen. Measured by the UV sensor patch, the sunscreen greatly reduced the UV exposure during an intermittent UV exposure in the morning, afternoon and evening.

Without the sunscreen protection, the UVA exposure was 0.0711±0.0215 MJ/m$^2$, 0.1716±0.0581 MJ/m$^2$, 0.1861±0.0600 MJ/m$^2$ measured at 11:50 am, 2:45 pm and 6:13 pm, respectively. With the sunscreen protection, the UVA exposure was 0.0021±0.0047 MJ/m$^2$, 0.0061±0.0084 MJ/m$^2$ and 0.0111±0.0139 MJ/m$^2$, respectively. We compared the UV dosimeter readings to the patch image analysis results, similar UVA exposure was shown without the sunscreen protection, 0.0896±0.0185 MJ/m$^2$, 0.1858±0.0372 MJ/m$^2$ and 0.2001±0.372 MJ/m$^2$, at 11:50 am, 2:45 pm and 6:13 pm, respectively. Due to the limitation of Scienterra dosimeters, the sunscreen effect could not be measured (FIG. 13B). Patch images, UV dosimeter readings and app readings were then compared for correlation. The statistical analysis shows strong correlation between UVA measured by Scienterra dosimeters and patch picture analysis ($p<0.0001$, $r=0.88$, $n=30$) (FIG. 14A), between the UV sensor patch app reading and the patch picture analysis ($p<0.0001$, $r=0.92$, $n=30$) (FIG. 6B), as well as between the Scienterra dosimeter and the UVA sensor patch app reading ($p<0.0001$, $r=0.92$, $n=24$) (FIG. 14C). The total UV dose which includes both UVA and UVB measured by Scienterra dosimeter and patch picture analysis is highly correlated, ($p<0.0001$, $r=0.87$, $n=24$) (FIG. 14D). The 95% prediction ellipse is shown. The strong correlation among the three measurements further validates the sensor system. The discrepancy between the UV sensor patch app reading and the other two measurements are due to the fast patch-scanning requirement for improved user experience.

Personal UV Data Collection from Different Geographical Location

The use of cell phone app enables data visualization on a large scale. X devices were distributed at no charge in X countries through La Roche Posay. The data was collected on a cloud servers and analyszed. FIG. 15 shows average personal UV exposure levels based on the My UV Patch app user data. Maximum UV exposure for each cell phone device is collected and averaged within each country (FIG. 15A, 15C) and state in US (FIG. 15B). Data from a total of 39 countries and 26 US states were received between Jun. 6, 2016 and Aug. 18, 2016, and were processed for the map.

Discussion

The ultraviolet Index (UVI) is a commonly used international standard UV measurement scale. UVI represents the strength of sunburn-producing UV radiation. It is a scaled version of the erythemally weighted irradiance falling on a horizontal surface; therefore, it implicitly includes a zenith angle cosine dependence. For complex surface topographies such as human skin, the personal exposure can be quite different from the idealized case of the radiation on a horizontal surface. Depending on the geometry of solar position and surface orientation, personal UV exposure can either be greater or less than the exposure predicted from UVI, sometimes by factors larger than 30%. For example, under cloudy conditions, the real UV exposure can be less than 50% of UVI. The UV dose received by human skin depends also on body-site. For example, UV exposure on the thigh will generally be less than on the top of the head or shoulder. However, it has been shown that the radiation on some specific sites, such as the wrist, can be considered as representative of a mean value.

Another limitation of UVI is that it is heavily weighted toward UVB, and there is an increasing body of data indicating that UVA also contributes to skin aging and skin cancer. Moreover, unlike UVB, UVA radiation can penetrate through glass windows. The UVA portion of the solar spectrum also has a much higher intensity than UVB (partly due to attenuation of UVB by atmospheric ozone, UVA doses are typically 20 or 30 times greater than UVB doses). These factors result in human skin being exposed to higher cumulative UVA doses than UVB doses. Because UVA does not contribute to suntan or sunburn as much as UVB, people are often not aware of excessive UVA exposures, especially on cloudy days or in indoor environments. In addition, skin damage from UV exposure is not immediately apparent. The erythemal reaction can occur more than 12 hours after exposure making it difficult for an average person to know what is the safe amount of UV radiation.

Modern broadband sunscreens provide effective protection against UVA as well as UVB radiation; however, even with sunscreen protection the skin can still be exposed to damaging UV doses. Therefore continuous personal UV exposure monitoring in the presence and absence of sunscreen is critical for better skin protection and prevention of skin cancer.

The objective of this project was to design and develop a low cost, wearable UV sensor for accurate quantification of personal UV exposures and degree of protection by sunscreens. MyUV patch provides continuous personal UV exposure monitoring with or without sunscreen applied and provides the user with recommendations for better UV protection. It is stretchable, breathable, and has similar mechanical properties to human skin. The user can apply sunscreen on the patch the same way as it is applied on the rest of the body. The patch then helps to provide information on how much the sunscreen reduced the user's UV exposure. We conducted two clinical studies that demonstrated sensor use versatility and data accuracy. The patch maintained accurate readouts even after exposure to ocean water, high heat and humidity, excessive sweat, skin care products and sunscreens. In fact, a main advantage of the patch is that it is capable of measuring UV doses in the presence of sunscreen, therefore providing direct measurement of the user's UV exposure when protected with sunscreen. We evaluated patch readout accuracy against Scienterra electronic dosimeters, which have been widely used in research studies involving personal UV exposures. The patch colorimetric analysis showed good correlation to the Scienterra devices. The ultimate test was through the wide distribution of the device to the public in July 2016, and the analysis of the resulting data, number of patches were distributed in countries around the world at no charge through La Roche Posay. This allowed us to acquire data on daily personal UV doses in different geographical locations and relate them to sunscreen usage and UVI in these locations (FIG. 15).

Methods
Printing

The reference colors are printed on TPU films (DingZing Advanced Materials Inc., Taiwan) using roller printing. The UV ink and blockers (Spectra Group Inc., USA) are then printed using screen printing with mesh size ranging from 110 to 380 um. Below the TPU film is the near field communication antenna (NXP semiconductors). The adhesives used in the patch are medical grade (Flexcon Inc., USA).

Calibration Methods

To calibrate the response of the UV dyes, the UV sensor patches are first calibrated under natural sun light with solar UV radiation. The solar UV radiation is measured by electronic UV dosimeters (Scienterra Inc, New Zealand). The Scienterra dosimeters are pre-calibrated against the instruments at the solar irradiance monitoring station in the UV-B monitoring and research program by National Renewable Energy Laboratory (NREL). The Scienterra dosimeters are also compared with radiative transfer calculations using tropospheric ultraviolet and visible (TUV) radiation model on several clear days in San Francisco.

During the development process, large batches of UV sensor patches are exposed to an Advanced Beam Optics Design Class A+AA Solar Simulator Model TSS-156 with AM1.5G spectrum from 300 to 1800 nm (OAI Inc. USA). The UV intensity is measured using the OAI 308 Meter and a 365 nm probe (OAI Inc. USA) and is kept constant. The images of the UV sensor patch are captured by a Nikon D5100 digital camera (Nikon Inc, USA). Images are processed using a Matlab routine (Mathworks Inc., USA). The response curves of the UV sensor patch are compared between the solar simulator exposure and natural sun light exposure to achieve consistency.

Software

During the development process, the image processing algorithm is written in Matlab. The image processing algorithm is then implemented using C/C++ with the OpenCV library for both Android and iOS apps. Part of the image processing is written in Objective-C for iOS and Java for Android. The visualizing of the world UV map is achieved by a custom web framework built in house using JavaScript, Node.js, require.js, HMTL and CSS.

Clinical Study Protocol

Healthy volunteers with skin photo type IV-VI according to the Fitzpatrick classification [19], with intact, healthy skin in the investigational areas were screened and recruited by Hill Top Research, Tex., USA. On each day of the study, the investigational areas including inner forearm, wrist and back of hands were gently cleaned with isopropyl alcohol patches. Pictures of the investigational areas were taken before patch application and after patch removal to evaluate skin irritation. Each subject wore one patch on the back of their left hand, one on the back of right hand and one on the inner forearm, respectively. Each subject wore a UVA Scienterra dosimeter and a UVB Scienterra dosimeter on their wrist. The patches on the back of hands are kept for multi-day continuous measurements while the patch on inner forearm was replaced daily. The patch evaluation study was conducted in St. Petersburg, Fla. On day 1, subjects walked along the pre-set route in the morning, at noon and in the afternoon for four miles, respectively. On day 2, subjects conducted beach activity for two hours and followed by one hour free city walk following a pre-determined route. On day 3, subjects repeated day 1 activity with La Roche Posay Anthelios 30 sunscreen applied on the skin as well on one of the UV sensor patches. Subjects scanned the patches with the pre-installed smartphone app. At the same time, patch pictures were also taken by a trained instructor. Patch images, UV dosimeter readings and app readings were compared. The clinical study protocol is approved by the institutional review board (IRB).

Statistical Analysis

Scatterplot matrices of the descriptors by time allow visualization of pairwise relationships. The associated Pearson correlation coefficients are displayed as tables or heat map representations. All statistical analyses have been performed using SAS statistical software release 9.3, SAS Institute Inc., Cary, N.C., USA, and JMP statistical software release 10.0 (JMP is a trademark of SAS Institute).

Hardware

The smartphone (user terminal) can include circuitry and hardware as is known in the art. The smartphone may include a CPU, a I/O interface, and a network controller such as BCM43342 Wi-Fi, Frequency Modulation, and Bluetooth combo chip from Broadcom, for interfacing with a network. The hardware can be designed for reduced size. For example, the CPU may be an APL0778 from Apple Inc., or may be other processor types that would be recognized by one of ordinary skill in the art. Alternatively, the CPU may be implemented on an FPGA, ASIC, PLD or using discrete logic circuits, as one of ordinary skill in the art would recognize. Further, the CPU may be implemented as multiple processors cooperatively working in parallel (such as a cloud computing environment) to perform the instructions of the inventive processes described above.

What is claimed is:

1. A device configured to measure ultra-violet (UV) radiation exposure, comprising:
    a surface that includes a plurality of different sections that each have a different sensitivity to UV radiation exposure,
    wherein each of the plurality of different sections are configured to display a different color in response to the UV radiation exposure,
    the surface further including a plurality of different fixed reference colors to each indicate a different corresponding UV exposure level, the plurality of different fixed reference colors being embedded among and intermingled with the plurality of different sections that each have a different sensitivity to UV radiation exposure.

2. The device according to claim 1, wherein the plurality of different sections include a different UV responsive chemical deposited thereon.

3. The device according to claim 2, wherein the UV responsive chemical is a LTV responsive ink.

4. The device according to claim 1, wherein the plurality of different sections include a different UV responsive electrical element.

5. A system for determining personal ultra-violet (UV) radiation measurements, comprising:
    a measurement device configured to measure UV irradiation; and
    a terminal device configured to receive or capture an output of the measured UV irradiation from the measurement device and to determine a specific user's personal UV exposure risk level based on at least the measured sun irradiation and information of a skin type of the specific user,
    wherein the measurement device includes a surface that includes a plurality of different sections that each have a different sensitivity to UV radiation exposure,
    wherein each of the plurality of different sections are configured to display a different color in response to the UV radiation exposure, the surface further including a plurality of different fixed reference colors to each indicate a different corresponding UV exposure level, the plurality of different fixed reference colors being embedded among and intermingled with the plurality of different sections that each have a different sensitivity to UV radiation exposure and
    the terminal device includes
        an image capturing device configured to capture an image of the plurality of different sections as the captured output of the measured UV radiation and the plurality of different fixed reference colors, and
        processing circuitry configured to determine the measured UV radiation based on performing image analysis of the captured image by comparing a color of the plurality of different sections with the plurality of different fixed reference colors.

6. The system according to claim 5, wherein the terminal device is configured to receive information from an external device of a personal UV dose amount for the specific user based on at least the information of the skin type of the user and the measured UV irradiation.

7. The system according to claim 5, wherein the terminal device is configured to output a recommended method of protection based on the determined personal UV exposure risk level of the specific user.

8. The system according to claim 7, wherein the image analysis includes at least one of a) a shape recognition and features location algorithm; b) a lighting condition correction algorithm; c) a color quantification algorithm; and d) a UV dose deteiinination algorithm.

9. A method, implemented by a system for determining personal ultra-violet (UV) radiation measurements, comprising:
    measuring, by a measurement device, UV irradiation; and
    receiving or capturing, by a terminal device, an output of the measured UV irradiation from the measurement device and determining a specific user's personal UV exposure risk level based on at least the measured sun irradiation and information of a skin type of the specific user,
    wherein the measurement device includes a surface that includes a plurality of different sections that each have a different sensitivity to UV radiation exposure,
    wherein each of the plurality of different sections are configured to display a different color in response to the UV radiation exposure, the surface further including a plurality of different fixed reference colors to each indicate a different corresponding UV exposure level, the plurality of different fixed reference colors being embedded among and intermingled with the plurality of different sections that each have a different sensitivity to UV radiation exposure and
    the method further includes a terminal device;
        capturing, by an image capturing device of the terminal device, an image of the plurality of different sections as the captured output of the measured UV radiation and the plurality of different fixed reference colors, and
        determining, by processing circuitry of the terminal device, the measured UV radiation based on performing image analysis of the captured image by comparing a color of the plurality of different sections with the plurality of different fixed reference colors.

10. The method according to claim 9, further comprising:
    receiving, by the terminal device, information from an external device of a personal UV dose amount for the specific user based on at least the information of the skin type of the user and the measured UV irradiation.

11. The method according to claim 9, further comprising:
outputting, by the terminal device, a recommended method of protection based on the determined personal UV exposure risk level of the specific user.

12. The method according to claim 9, wherein the image analysis includes at least one of a) a shape recognition and features location algorithm; b) a lighting condition correction algorithm; c) a color quantification algorithm; and d) a UV dose determination algorithm.

* * * * *